United States Patent
Jordan et al.

(10) Patent No.: US 8,213,592 B2
(45) Date of Patent: *Jul. 3, 2012

(54) CALL MANAGEMENT USING CALL ROUTING ENGINE

(75) Inventors: Kenneth Jordan, Groton, MA (US);
Tse-Ming Wang, Acton, MA (US);
Vincent Milano, Jr., Westwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 1727 days.

This patent is subject to a terminal disclaimer.

(21) Appl. No.: 11/374,952

(22) Filed: Mar. 14, 2006

(65) Prior Publication Data

US 2006/0188078 A1   Aug. 24, 2006

Related U.S. Application Data

(63) Continuation of application No. 09/670,864, filed on Sep. 27, 2000, now Pat. No. 7,099,451.

(51) Int. Cl.
*H04M 3/42* (2006.01)

(52) U.S. Cl. .......... 379/212.01; 379/207.01; 379/221.01

(58) Field of Classification Search ............ 379/212.01, 379/240, 142.07, 207.01, 220.01
See application file for complete search history.

(56) References Cited

U.S. PATENT DOCUMENTS

| | | | |
|---|---|---|---|
| 4,737,983 A | 4/1988 | Frauenthal et al. | |
| 5,036,535 A | 7/1991 | Gechter et al. | |
| 5,274,700 A * | 12/1993 | Gechter et al. | 379/211.01 |
| 5,452,348 A * | 9/1995 | Adams et al. | 379/202.01 |
| 5,684,870 A | 11/1997 | Maloney et al. | |
| 5,873,130 A | 2/1999 | Lafferty | |
| 5,878,130 A | 3/1999 | Andrews et al. | |

OTHER PUBLICATIONS

"System Manager Guide Supplement for the Aspect ACD (Event Link Version)", Vin Milano, Revision 0.4, Apr. 21, 1999.
Milano, Vin, "System Manager Guide Supplement for the Aspect ACD (Event Link Version)", Revision 0.4, Apr. 21, 1999, GeoTel Communications, Corporation.

* cited by examiner

*Primary Examiner* — Curtis Kuntz
*Assistant Examiner* — Amal Zenati (57) ABSTRACT

A telephone call management system first receives a call over a telephone network from a calling device. The calling device is connected to a first called device by a first connection through the telephone network. A first call management message is received at a call routing engine, the first call management message to cause the engine to initiate establishment of a second connection among the calling device, the first called device, and a second called device. The engine issues, in response to the first call management message, a second call management message specifying a DTMF sequence for provision to the telephone network to cause the telephone network to establish the second connection. The telephone network may be a public switched telephone network.

50 Claims, 7 Drawing Sheets

CALL MANAGEMENT USING CALL ROUTING ENGINE

RELATED APPLICATIONS

This application is a continuation of U.S. patent application Ser. No. 09/670,864, to Kenneth Jordan et al., filed on Sep. 27, 2000 now U.S. Pat. No. 7,099,451, tiled CALL MANAGEMENT USING CALL ROUTING ENGINE.

BACKGROUND OF THE INVENTION

1. Field of the Invention

The present invention relates generally to call management using a call routing engine in a communications system, and more specifically, to a call management technique that involves processing by the engine after an initial call connection has been established in the system.

2. Brief Description of Related Prior Art

Systems for managing and routing calls through public and/or private communications networks are known in the art. Conventional automatic call distribution (ACD) systems route calls to agents in telemarketing and service inquiry centers, and provide limited real-time call management and reporting capabilities. A typical ACD system will monitor the status of the agent and, when an incoming call is received, selects the agent to handle a particular service request. Reporting and performance data from the agents are also generated by the ACD.

One particular type of scheme for distributing calls to agents is disclosed in Frauenthal et al., U.S. Pat. No. 4,737,983. According to Frauenthal et al., data representing the present call congestion of each of the ACD systems is accumulated in a database. Using the data in the database, the percentage of calls made to the ACD systems, as a group, is determined. The information is then used to generate call routing information. When a new call is made to the central office, the routing information is queried to determine which of the ACD systems is to receive the call, so as to balance the call traffic load across the ACD systems.

Another call management and distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al., when an incoming call is made to the call router, it decides which agent station should receive the call, establishes a call with that agent station, and then transfers the original call onto the second call to connect the incoming caller directly to the agent station and then drops out of the connection (See, Gechter et al., column 11, lines 45-51).

Other prior art call management, routing, and distribution techniques are disclosed in Andrews et al., U.S. Pat. No. 5,878,130, which is assigned to the assignee of the subject application. This patent discloses a communications system and method for automatically making telephone routing decisions with global authority based upon information gathered in real time from the entire communications system and global optimization criteria. The entirety of the disclosure of the Andrews et al. patent is incorporated herein by reference.

In conventional systems that implement the call processing techniques disclosed in the Andrews et al. patent, it is often desirable to facilitate certain "post-routing" call processing features. A call is considered to undergo "post-routing" processing when after the call has already been initially routed to an initial destination, the same call is again processed such that another destination or called device becomes involved in the call. Examples of conventional "post-routing" call processing features include, e.g., the ability to transfer a call, initially routed via a public network (e.g., a public switched telephone network (PSTN)) to a first called device (e.g., an ACD and/or interactive voice response (IVR) unit-containing system), from the first called device to a second, remote called device, the ability to conference the calling device and/or the first called device with the second called device, etc. Such post-routing call processing may be initiated by the first called device, and when the called devices comprise ACD or IVR systems typically is facilitated by one or more telecommunications inter-site tie-lines connecting the first and second called devices. Unfortunately, however, the use of such inter-site tie lines undesirably increase the cost and complexity of implementing such post-routing call processing features.

Other prior art communications systems utilize conventional integrated services data network (ISDN) and American Telephone and Telegraph (AT&T) technologies to carry out such post-routing call processing features, without using such inter-site tie-lines. However, such prior art communications systems do not control public switched telephone network and local switch resources (e.g., in the called devices) as a single virtual switching resource when implementing such post-routing call processing features. Disadvantageously, this undesirably increases the cost and complexity associated with implementing such post-routing call processing features in such systems, and makes less efficient the use of the telecommunications resources of the called devices and the public network.

Thus, it would be desirable to eliminate the need to use such inter-site tie-lines to facilitate post-routing call processing features, and to provide a mechanism that reduces the cost and complexity associated with implementing post-routing call processing features and ensures that telecommunications resources of called devices and the public network are used more efficiently than in the prior art.

SUMMARY OF THE INVENTION

According to the present invention, a call management technique is provided that overcomes the aforesaid and other disadvantages and drawbacks of the prior art. More specifically, in the technique of the present invention, a public network is used in place of inter-site tie-lines between called devices, to facilitate implementation of conventional types of post-routing call processing features. Also in accordance with the present invention, the public network and local switch resources are controlled as a single virtual switching resource when implementing such call processing features.

In one embodiment of a call management method according to the present invention, the engine receives a first call management message that causes the engine to initiate establishment of either (1) a first connection, via a public network (e.g., a long distance carrier PSTN network), between one called device and a calling device, or (2) a second connection, via the public network, among the one called device, the calling device, and the another called device. The engine receives the message at a time when the calling device is already connected to the another device via the public network.

The first message may be generated and supplied to the engine by the another called device. The engine, in response to the received message, generates and issues (e.g., to the another called device) a second call management message. The second call management message specifies a dual tone multifrequency (DTMF) sequence (i.e., a sequence or series of DTMF tone signals) that when and if provided to the network cause the network to initiate the establishment of either the first connection or the second connection. That is, the provision of the sequence to the network causes the network to initiate the creation of either the first connection or second connection, depending upon the particular contents of the sequence.

After the another called device has received the second call management message, the another called device may provide the DTMF sequence specified therein to the network via, e.g., a third connection that existed, via the network, between the another called device and the calling device prior to the receipt of the first call management message by the engine. Thereafter, the another called device or the network may terminate the third connection.

The first connection may be made for the purpose of executing or facilitating a call transfer operation; the second connection may be made for the purpose of executing or facilitating a call conferencing operation. The one and another called devices may each comprise a respective voice response unit (VRU) connected to the public network and/or a respective ACD system connected to the network. The calling device may be external to the VRU and ACD systems comprised in the call devices.

The DTMF sequence may include at least two portions: a first portion that specifies which of the first or second connections is to be established by the network, and a second portion that specifies a destination label (e.g., corresponding to a destination dialed number identification service (DNIS) or trunk identification number) in the network that corresponds to the one called device.

Advantageously, the technique of the present invention eliminates the need to use inter-site tie-lines to implement call transfer and conferencing post-routing features, thereby reducing the cost and complexity of implementing such features, according to the present invention, compared to the prior art. Also advantageously, the technique of the present invention permits local switching resources (e.g., in the called devices) and the public network to be controlled as a single virtual switch for purposes of implementing such features, thereby ensuring that the telecommunications resources of the called devices and public network are used more efficiently according to the present invention, compared to the prior art.

It will be appreciated by those skilled in the art that although the following Detailed Description will proceed with reference being made to illustrative embodiments and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

Other features and advantages of the present invention will become apparent as the following Detailed Description proceeds, and upon reference to the Drawings, wherein like numerals depict like parts, and wherein.

DETAILED DESCRIPTION OF PREFERRED EMBODIMENTS

Figure 1:
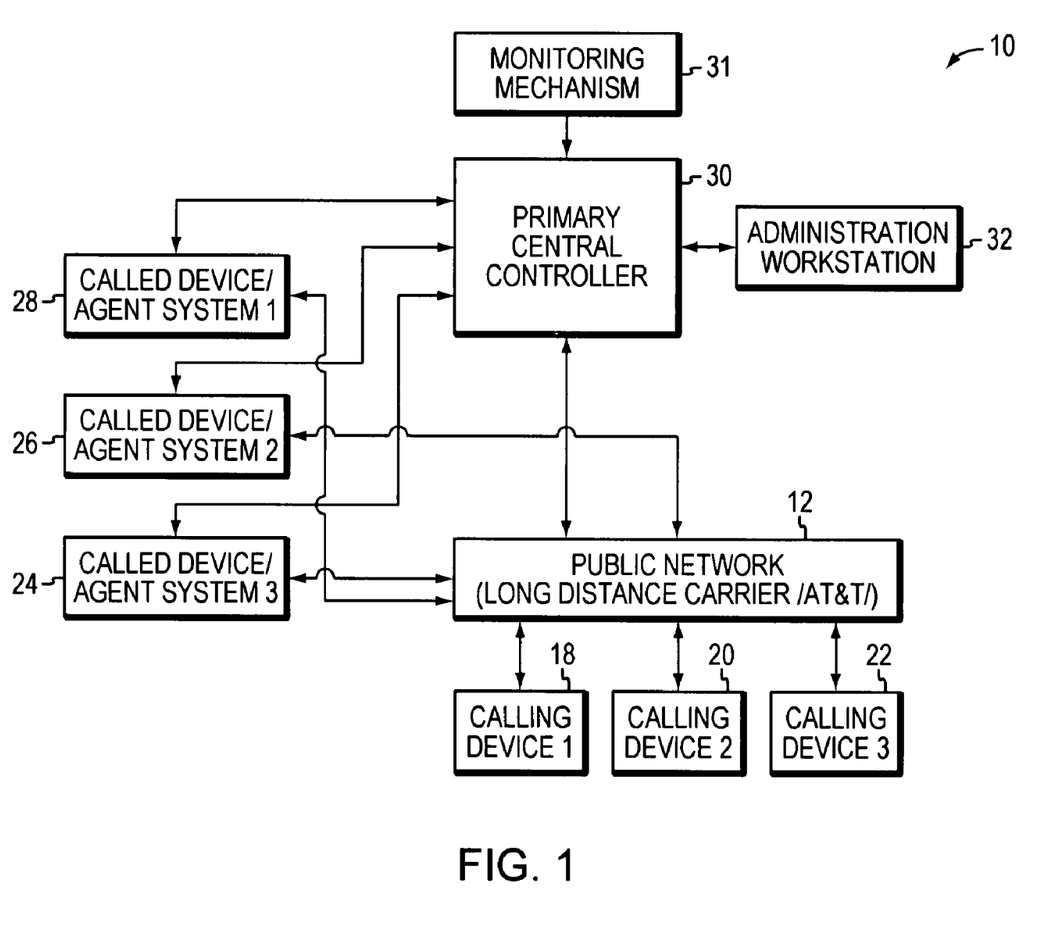
FIG. 1 is a functional block diagram of one embodiment of a communications system wherein the present invention may be practiced to advantage.

FIG. 1 is an architectural-level block diagram illustrating functional components of a communications system 10 wherein the present invention may be advantageously practiced. System 10 includes a plurality of agent systems 24, 26, 28 connected to a primary central controller 30 and at least one public switched telephone and/or long distance carrier network (e.g., an AT&T long distance carrier network) 12. Calling devices 18, 20, 22 place calls to called devices (i.e., agent systems 24, 26, 28) via public network 12. As will be explained more fully below, primary central controller 30 generates command messages for controlling routing and distribution of calls through the long distance carrier to and from the agent systems, and through the agent systems themselves to and from individual workgroups, customer agents and/or caller services, based upon requested service messages (e.g., telephone numbers and/or other information and messages supplied from the calling devices and public network, and/or call management request messages from the called devices), status messages (i.e., availability of resources for use by callers, loading of system resources, etc.) supplied by the agent systems, and user-generated call routing control scripts) stored in controller 30. Administration workstation 32 permits user access and control of the system 10 by, for example, permitting generation and modification of system configuration data, call routing scripts, etc. stored in controller 30. Monitoring and diagnostic mechanism 31 monitors the various elements of the system (i.e., the agent systems 24, 26, 28, administration means 32, etc.) to determine whether these elements are functioning properly. If a malfunction is detected, that fact is signaled to the central controller 30, so that it can undertake appropriate action to correct and/or eliminate the malfunction and/or any resulting problems to the system 10 from the malfunction.

Although not shown in the Figures, the conventional long distance carrier network 12 includes a long distance control network (e.g., AT&T's Signaling System 7 (SS7) control network) and local exchange carriers. The long distance control network controls routing of calls through the long distance network serviced by the exchange carriers. When a long distance call request is initially received from a calling device (e.g., a caller at a calling device dials a toll free long distance telephone number) by the exchange carrier, it forwards the call request to the long distance network, which routes the call to its intended destination. In system 10, when the long distance control network receives a request for long distance connection to one of the agents in the agent systems' workgroups or caller services, the long distance control network forwards the long distance routing request to the central controller 30. As will be described more fully below, central controller 30 then processes the request and controls the system 10 to route the call to a destination in accordance with call routing control scripts executed by the controller 30. The system 10 accomplishes call routing by, inter alia, translating the routing request message into a route response or command message that addresses the desired destination. It is important to note that although the following description will proceed with reference to use in connection with AT&T's long distance control network, if other long distance control networks (e.g., those provided by other long distance carriers, such as, British Telecom, Energis, France Telecom, Cable and Wireless, MCI, and Sprint) are provided with control features similar to those of the AT&T long distance control network that are used to advantage in system 10 in accordance with the present invention, these other long distance carrier networks may be used in system 10 in place of, or together with, the long distance carrier network comprised in network 12.

As is known to those skilled in the art, call destinations are commonly termed "labels." A "label" may be or specify e.g., a particular destination telephone number, trunk group, or DNIS number.

Figure 2:
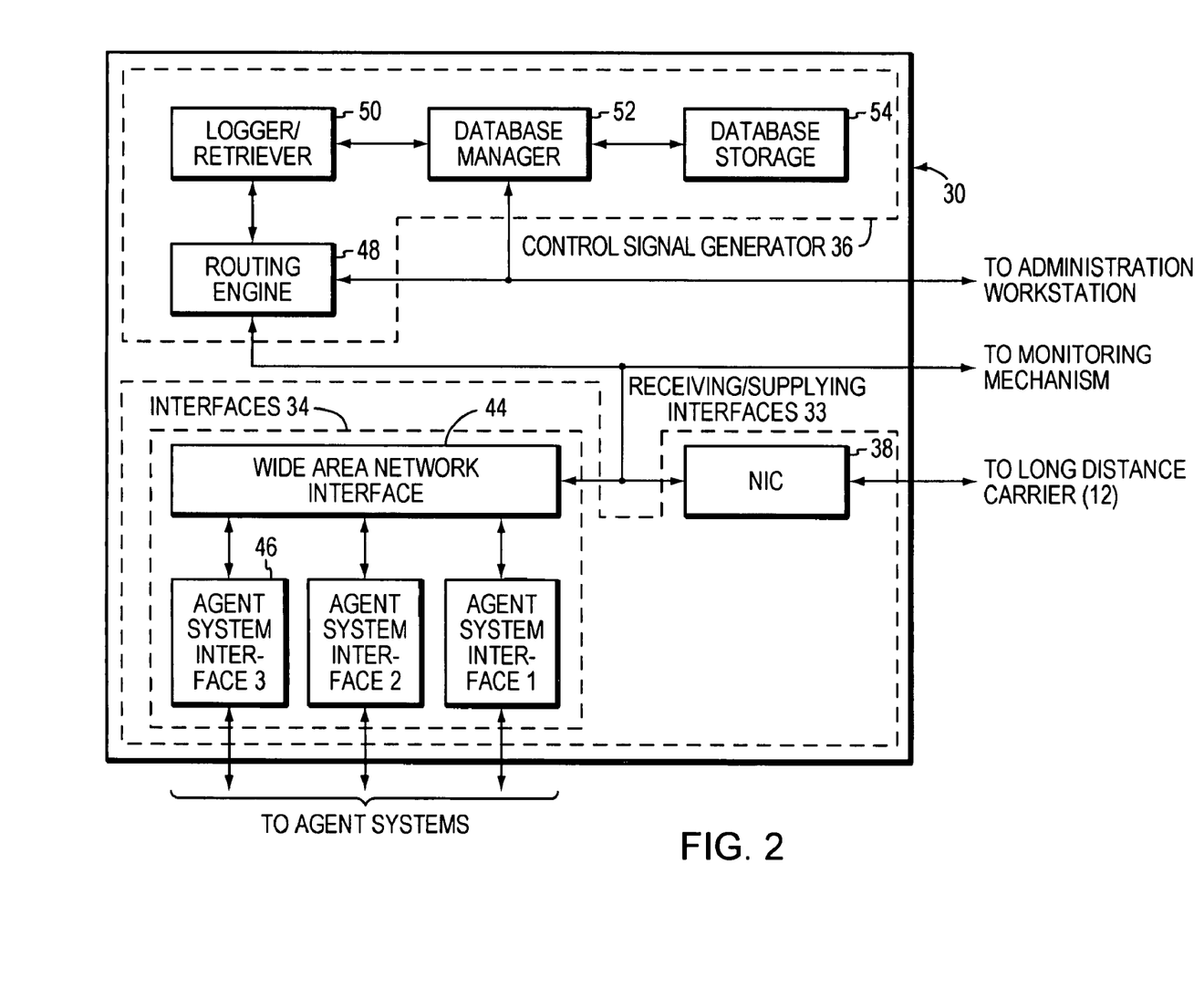
FIG. 2 is a functional block diagram of the primary central controller of the system of FIG. 1.

FIG. 2 is a schematic block diagram illustrating functional components of the central controller 30. Controller 30 includes interfaces 33 for receiving status and requested service messages, and for supplying command messages generating by the controller 30 to the public network and the agent systems. Interfaces 33 include a long distance carrier network interface controller (NIC) 38 that interfaces the controller 30 to the public network 12. The NIC 38 is appropriately constructed to permit transmission of command messages to and receipt of requested service and other messages from the network to which it is connected. For example, if NIC 42 is connected to an AT&T network, then it is appropriately constructed to permit transfer of command and requested service messages between the controller 30 and the SS7 network; additionally, the NIC 42 may be constructed to receive and process from the SS7 network confirmation messages that confirm that command messages provided to the SS7 are proper for the SS7 network and have or are being acted upon by the SS7 network.

Interfaces 33 also include agent interfaces 34 for interfacing the controller 30 to the agent systems 24, 26, 28. Interfaces 34 include agent system interfaces 46 connected to a conventional wide area network interface 44 which connects the controller 30 to the interfaces 34 so as to permit transmission of status and other messages from the agent systems to the routing engine 48, and to permit transmission of command and other messages to the agent systems 24, 26, 28. It should be understood that the particular types of interfaces 46 used will depend upon the particular constructions of the agent systems, the wide area network (not shown) that connects the controller to the agent systems, and the controller itself Interface 44 may be adapted for use with a conventional TCP/IP (Transmission Control Protocol/Internet Protocol) network (not shown, which connects the controller to the agent systems), although alternatively, interface 44 may be constructed for use with networks that use other network protocols.

Figure 5:
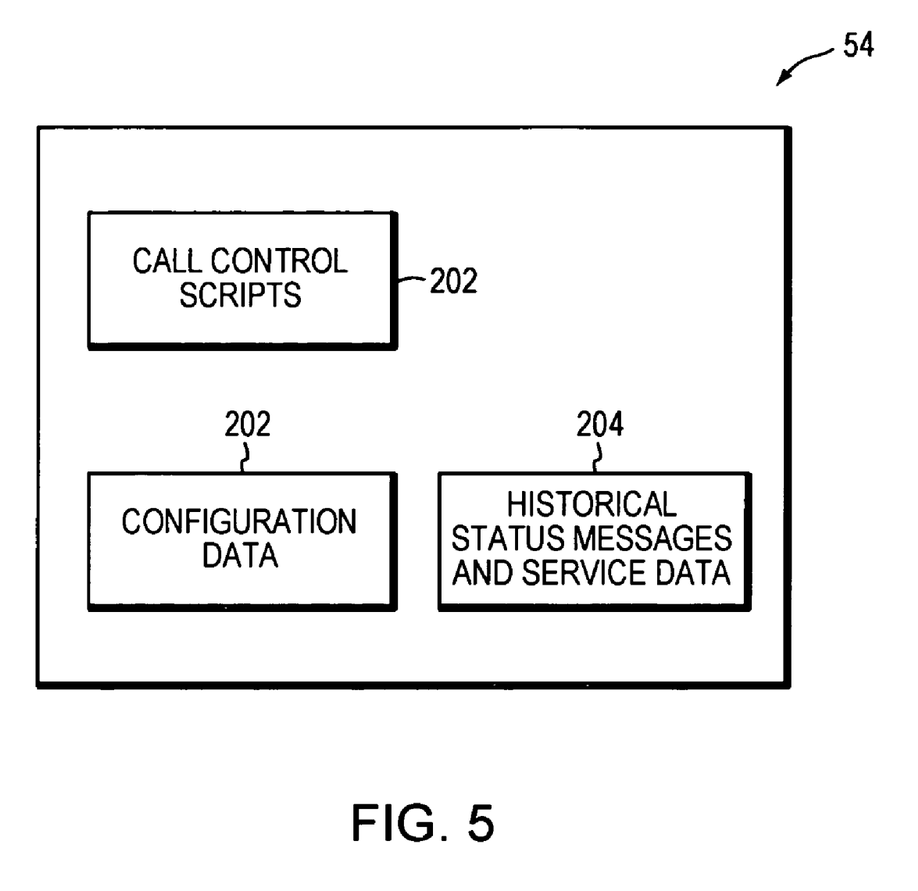
FIG. 5 is a schematic block diagram illustrating data structures in the database shown in FIG. 4.

Control signal generator 36 is connected to the interfaces 33, monitoring mechanism 31, and administrative workstation 32. Control signal generator 36 comprises routing engine 48, database logger/retrieving engine 50, database manager 52, and database 54. Routing engine 48 determines how to route calls in the system 10 (i.e., through the public networks to the agent systems, and in the agent systems themselves), and transmits this routing information (e.g., in the form of appropriate command messages) that address the desired end-termination (e.g., an agent station or workstation in a workgroup/caller service in the system) to interfaces 33, 34 for transmission to the agent systems and long distance control network, respectively. In order to determine how to route calls in the system, routing engine 48 takes into consideration real-time requested service messages supplied to it by the interfaces 33, system configuration data 202 (see FIG. 5) and historical (i.e., previously stored) requested service data derived from requested service messages and status messages 204 retrieved by logger/retriever 50 at the command of the routing engine 48 from the system's historical database (comprising database manager 52 and storage mechanism 54), real-time status messages from the agent systems supplied to it from the interfaces 34, information from the monitoring mechanism 31 concerning what components (if any) of the system are currently unavailable because they are malfunctioning or inoperative, and routing optimization criteria and/or rules and commands in the form of call routing control scripts 200 generated by the administration workstation and stored in database 54. Routine engine 48 uses this data to determine the manner in which to route calls in the system. After making its decision on how best to route a particular call, generating appropriate command messages to implement this decision, and transmitting the command messages to the interfaces 33 and 34, routing engine 48 instructs logging engine 50 to store the real-time information presented above in the database 54 for use in determining how to route later calls. Logging engine 50 in turn, commands database manager 52 to store this information in database 54.

Figure 3:
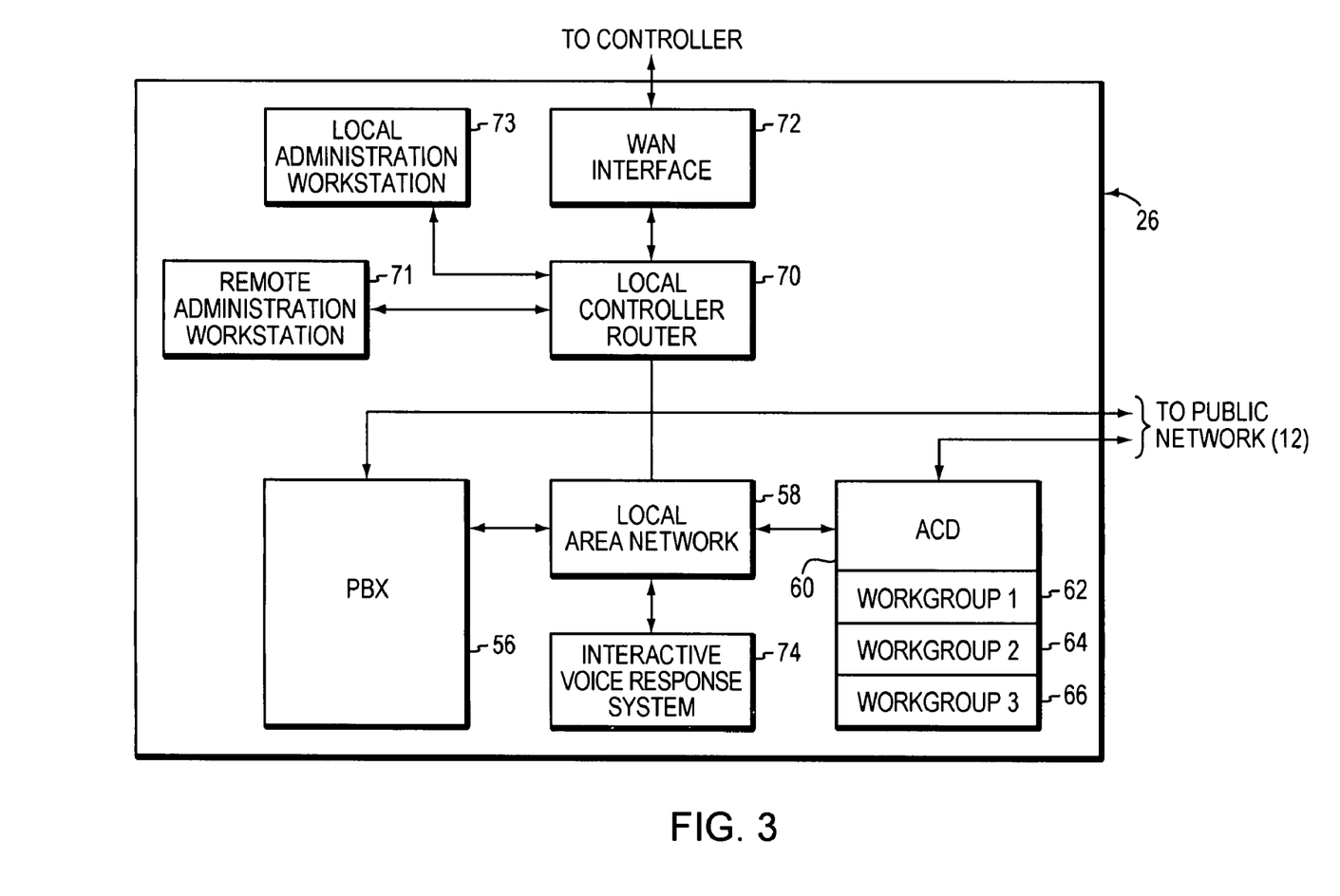
FIG. 3 is a functional block diagram of an agent system in the system of FIG. 1.

FIG. 3 is a functional block diagram of an agent system 26. Agent system 26 comprises an interface 72 for interfacing the agent system's local controller/router 70 to the controller's wide area network interface 44, so as to permit transfer of command and other messages from controller 30 to local controller 70 and status and other messages from the local controller 70 to controller 30. In response to command and other messages received by local router 70 from controller 30, local router 70 issues commands to the ACD/IVR, or PBX system causing the public network interface (not shown) in the ACD, PBX or IVR to connect and disconnect calls received thereat from the public network, to and from appropriate caller services (e.g. interactive voice response system 74), or individual agents (e.g. connected to private branch exchange (PBX) 56 or ACD 60). It should be noted that the particular type and number of caller services and agent workgroups shown in FIG. 3 are merely for illustrative purposes and may vary. Local router 70 issues commands via the conventional local network 58 to the caller service or individual agent system in the workgroup to which the call is connected, as to how the individual agent or caller service is to distribute or process the call. For example, depending upon the command messages transmitted by the controller 30 to controller 70, controller 70 may instruct the call to be forwarded directly to the interactive voice response system 74 which is connected as an answering resource to ACD 60, and instruct the interactive voice response system to store information from the call for later retrieval and transmission to a workstation (not shown) connected to the PBX 56, or to connect the call to the ACD 60 and instruct the ACD to forward the call to one of its workgroups 62, 64, 66. Of course, it will be appreciated that if appropriately modified, the network interface may be comprised within the public network or may comprise a separate, stand-alone interface distinct from the agent systems.

Likewise, if the PBX, IVR, and/or ACD are appropriately modified so as to include other of the various functional components of the agents (e.g. router 70), they may be eliminated, or comprised as separate functional components from the agent system. Local controller 70 also may query the individual agents and caller services for status information (e.g. whether they are active or busy, what resources are available for use by callers, etc.) and/or may receive reports containing such status information from the agents and caller services; this information and/or reports may be gathered by the controller 70 via the local network 58, and may be transmitted by the controller 70 to the central controller 30 via interface 72 for use in the central controller's routing decisions.

Agent system 26 may also comprise local administration workstation 73 for permitting user control of the local router 70, and remote administration workstation 71 for permitting remote control of central controller 30. Both administration workstations 73, 71 are of similar construction to administration workstation 32. Local administration workstation 73 may be limited in its ability to control local router 70 (i.e., only to control matters not being controlled by central controller 30). Likewise, remote administration workstation 71 may be limited in its authority over system 10 such that administration workstation 32 may override commands issued by administration workstation 71.

Figure 4:
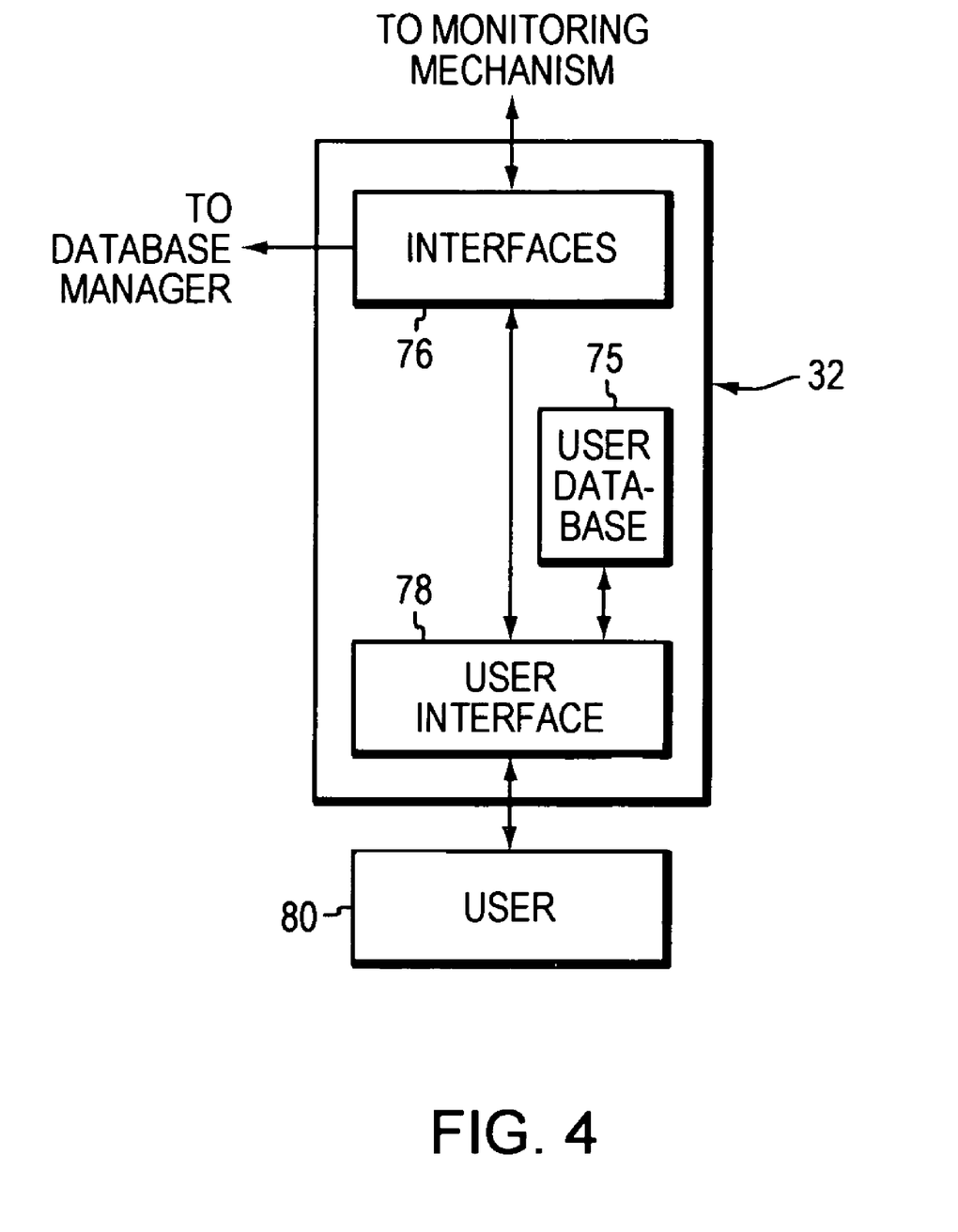
FIG. 4 is a functional block diagram of an administrative workstation used in the system of FIG. 1.

FIG. 4 is a functional block diagram of administration workstation 32. Work-station 32 may comprise a user input/output interface 78 connected to central controller interface 76. User interface 78 may comprise a graphical user interface for permitting a human user 81 to generate, edit, and store call control routing scripts 200, system configuration data 202, etc. in the database 54 of the central controller 30. The database interface 76 is adapted to change the user's graphically input data into a form usable by the central controller in the central controller's database 54. Administration workstation 32 comprises a user-accessible database 75 for storing real-time information and configuration information and for permitting such information to be communicated to a human user via the user interface 78. Also, administration workstation 32 permits a user to monitor various system activities and current system information, such as, call routing, system configuration, etc.

The above-presented functional components (with the exception of network 12) of system 10 may be embodied as, or comprise one or more distributed computer program processes executing in a plurality of computer nodes; each of these nodes may include computer-readable memory for storing software programs, algorithms, and data structures associated with, and for carrying out, the inventive techniques, and related and other techniques and methods described herein as being carried out by or implemented in system 10. In addition, each of these nodes may further include a processor (e.g., an Intel 80×86 processor) for executing these software programs and algorithms, and for manipulating the stored data structures, to enable the nodes to carry out these methods and techniques in system 10. Additionally, the nodes may be provisioned with such networking hardware and software (e.g., including computer networking and telephonic communications hardware and software) as is needed to enable performance of the stated functionality.

It should be noted that the functional components of the system 10 may vary depending upon particular functional and operational requirements. For example, the existing components of system 10 may be modified to incorporate the functionality of, or the system 10 may be modified to include, fault-tolerance-related functional components (e.g., a redundant central controller), components related to processing of Internet calls, and/or call-queuing-related components described in the aforesaid Andrews et al. patent (i.e., U.S. Pat. No. 5,873,130). Accordingly, it should be appreciated that the present invention may be practiced in systems other than system 10 (e.g., in systems having different and/or additional functional components like those described in the aforesaid Andrews et al. patent, and other communications systems).

Figure 6:
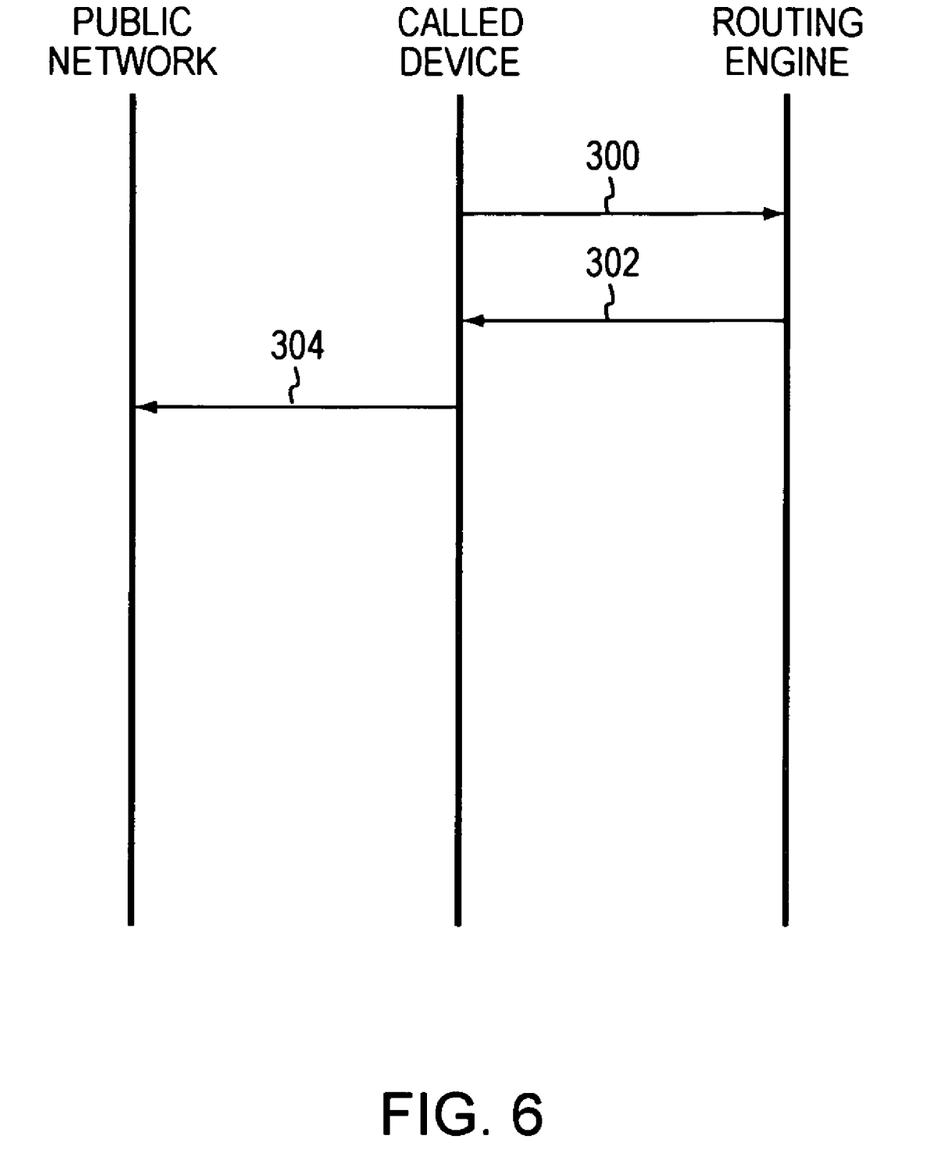
FIG. 6 is a schematic diagram illustrating messages exchanged in the system of FIG. 1 in accordance with an embodiment of a call management technique according to the invention.

Turning to FIG. 6, an embodiment of an inventive post-routing call management/processing technique used in the communication system 10 of FIG. 1 will now be described. FIG. 6 illustrates messages used to implement this embodiment of the invention. It should be understood that the following description of this embodiment will proceed with the assumption that the call that is to undergo post-routing call processing has already been initially routed from a calling device (e.g., device 18) to a called device (e.g., device 26) via the public network 12 and an existing call connection exists between the two devices 18, 26 through that network 12. This existing call connection may have been made to e.g., an individual agent device (e.g., a not shown agent telephone station or computer-telephony-integration (CTI) workstation comprised in one of the workgroups, or an IVR system) of the called device 26, and may have been established based upon command messages issued from the routing engine 48 to the public network 12 and called device 26.

Prior to the commencement of the technique of FIG. 6, the device 26 places the existing call connection on hold. The technique of FIG. 6 then commences with the generation and issuance by the called device 26 to the routing engine 48 of a post-routing call processing request message 300. More specifically, the message 300 may be generated by the local router 70 of the device 26 in response to an initial post-routing call processing request message issued to the local router 70 by the individual agent station or CTI workstation to which the call was initially routed, and once generated by the local router 70 may be supplied to the routing engine 48 via the interfaces 34, 72.

In essence, message 300 requests that the routing engine 48 issue a command message 302 for initiating, depending upon the particular contents of message 300, either a transfer to another called device (e.g., agent system 28) of the existing call that is presently connected to the device 26, or a three-way conference call among the called devices 26, 28 and the calling device 18. More specifically, message 300 may request that the routing engine 48 issue a command message 302 that initiates either the transfer of the existing call, via the network 12 through which the existing call connection has been established, from the device 26, to e.g., a specified destination agent station or CTI workstation, or IVR system comprised in the second agent system 28, or a three-way conference call among the agent station/CTI workstation or IVR system of device 26 to which the existing call is connected, the calling device 18, and a specified destination agent station/CTI workstation or IVR system comprised in device 28.

As will be described below, in response to receipt of the message 300, the routing engine 48 selects a destination label in the public network 12 that is appropriate for the desired destination and post-routing operation (i.e., call transfer or conferencing operation) requested and specified in the message 300, and issues command message 302 that addresses that destination label, to the device 26. Based upon the message 302, the local router 70 of device 26 generates and issues to the public network 12 a network DTMF command message 304. Although not shown in FIG. 7, prior to issuing the network command message 304, local router 70 of the device 26 may also generate and issue to the routing engine 48 one or more confirmation messages that indicate that the device 26 has accepted and is acting upon the command message 302. Likewise, depending upon the particular configuration of the network 12, the network 12 may provide one or more confirmation messages (not shown) to the engine 48 and/or local router 70 to indicate that it is or has completed acting upon the message 304. In response to receipt of the message 304, network 12 establishes either a new call transfer connection, via the network 12, between the calling device 18 and the second called device 28, or a new conference call connection, via the network 12, among the calling device 18 and first and second called devices 26, 28, depending upon the type of post-routing operation (i.e., either call transfer or conference call operation) commanded by the message 304.

When the engine 48 receives the confirmation message(s) sent to it from the network 12 and/or local router 70 of device 26, the engine 48 may issue to the local router 70 of the second called device 28 other appropriate message(s) to cause the second called device 28 to perform the operations necessary to receive and process the new call connection that is being established through the network 12 to the destination corresponding to the destination label. The destination label addressed in the messages 302, 304 corresponds to the agent station/CTI workstation or IVR system in device 28 that will be involved in the new call connection (i.e., either the transfer connection or the conference connection).

Prior to transmitting the message 304 to the network 12, the local router 70 of device 26 may return the initially-established call connection to an active status, and depending upon the configuration of device 26, may clear any call connection initially generated by the device 26 solely as a consequence generation and issuance of the message 300. The local router 70 may then transmit the message 304 to the network, via the initially-established call connection, in the form of a sequence of DTMF tones which are acted upon by the control network of the network 12 to establish the new call connection. After the local router 70 receives confirmation message(s) from the network 12 that indicate that the new call connection has been established, the device 26 may terminate the initially-established call connection (e.g., if the new call connection is a transfer connection for facilitating the transfer of the call to the second called device 28), and free the telecommunications resources of the called device 26 that were previously involved in the initial call connection, for use in other call processing. Thereafter, the second called device 28 and the calling device 18 may exchange data via the transfer connection established by the network 12. Conversely, if the new connection is a conference call connection for facilitating conferencing of the devices 18, 26, 28 via the network 12, the new connection established via network 12 may permit simultaneous exchange of data among the devices 18, 26, 28 via the network 12.

Messages 300 and 302 may each contain respective data values and/or structures that identify and/or specify, inter alia, the type of post-routing call processing being requested or commanded (e.g., whether such processing involves call transfer or conferencing), respectively, and the initially-established call connection and telecommunications resources of the calling 18 and called devices 26, 28 and public network 12 involved in that processing. The data specified in these messages may also include call context-related information.

More specifically, message 300 may include data structures or values which identify and/or specify the original routing client's call-control related information, the called routing client's call-control related information, the type of post-routing call processing being requested or commanded, the telephone number to which the original call was made, the telephone number of the calling device, any caller-entered digits (e.g., as a result of interaction with a voice response unit in system 10), and whether the message 300 is being sent from a voice response unit. The call-control related information may identify and/or specify, e.g., a physical controller of a routing client associated with the call-control related information, the routing client itself, and the identity of the call and the initial call connection between the calling device and the first called device as known to the routing client. As stated previously, message 302 addresses a destination label in network 12 that is appropriate for the given post-routing call processing being requested by message 300. In addition, message 302 may include data structures or values which identify and/or specify the original and called routing client's call-control related information, and the type of post-routing call processing being requested or commanded. The message 302 may also specify whether additional post-routing call processing features may be invoked after processing of the subject post-routing call processing feature being requested by the message 302.

In accordance with this embodiment of the invention, the destination label is specified in the message 302 as part of a concatenation of data values. The structure 400 of this concatenation is shown schematically in FIG. 7. The first two values 402, 403 of structure 400 may be thought of as a prefix 401 to the value 404 of the actual destination label, and the last value 406 may be thought of as a suffix to the destination label value 404. The first prefix 402 is a character string having a value of either "DTMF" or "DTMFD". The second prefix 403 is a network activation code, "*8". If the post-routing call processing commanded by message 302 is a conference call operation, then the suffix value 406 is a network control code, "*7". Otherwise, the value 406 is omitted from the structure 400.

Figure 7:
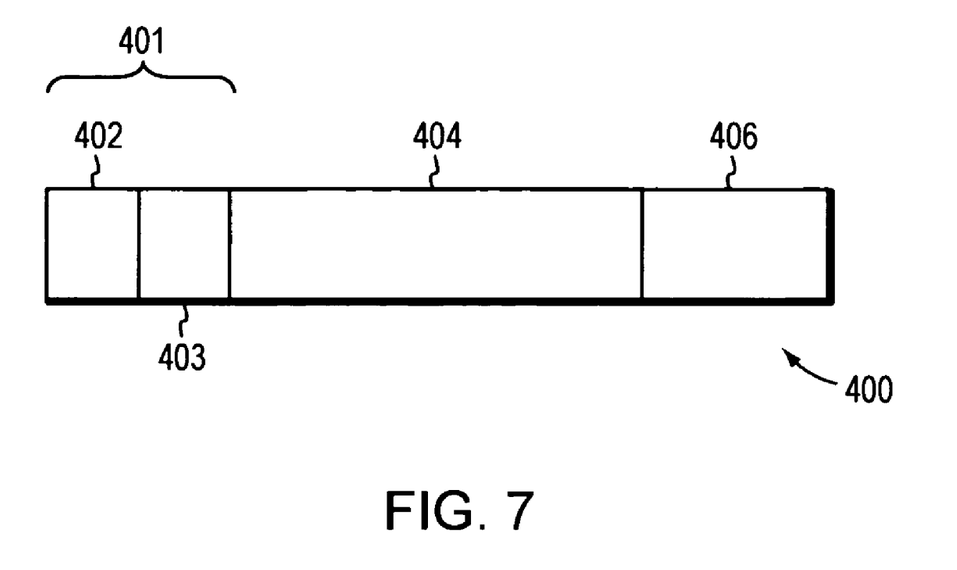
FIG. 7 is a schematic diagram illustrating a DTMF sequence that may be supplied to a public network in one embodiment of the invention.

When the local router 70 of device 26 receives the message 302, it parses the structure 400 contained therein to separate the values 402, 403, 404, and, if present in the structure 400, also the value 406. If the value 402 is "DTMFD", this signifies to the local router 70 of device 26 that the router 70 of device 26 is to generate and issue the DTMF command message 304 to the network 12, based upon the contents of values 403, 404, and 406 and thereafter, to disconnect the initially established connection between device 26 and device 18. Conversely, if the value 402 is "DTMF", this signifies to the local router 70 of device 26 that the local router 70 of device 26 is to generate and issue the DTMF command message 304 to network 12 based upon the contents of values 403, 404, and 406, but thereafter not to disconnect the initially-established connection. Local router 70 of device 26 then causes device 26 to transmit to the network 12 (after returning the initially-established call connection to active status from hold status) a sequence of DTMF tones corresponding to the values 403, 404, and 406 (if value 406 is present in structure 400), in the foregoing sequence order. The AT&T control network in network 12 is programmed such that, when received by the control network, these DTMF tones cause the network 12 to establish a call connection, via network 12, between only the destination in device 28 specified by the value 404 and the calling device 18, unless DTMF tones corresponding to the suffix value 406 are transmitted; if DTMF tones corresponding to the suffix value 406 are transmitted, then the network 12 establishes a conference call connection, via network 12, involving the destination in device 28 specified by the value 404, the calling device 18, and the called device 26, via which conference call connection devices 26, 28, 18 may simultaneously exchange data.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A telephone call management method, comprising:
receiving a call over a public switched telephone network from a calling device;
establishing a first connection between the calling device and a first called device through the public switched telephone network;
determining a second called device should be added to the call;
issuing a first call management message from the first called device to a call routing engine, the first call management message to request the call routing engine issue a second call management message to initiate establishment of a second connection to enable a call among the calling device, the first called device, and the second called device; and
receiving the second call management message from the call routing engine at the first called device, the second call management message specifying a DTMF sequence for provision by the first called device to the public switched telephone network to cause the public switched telephone network to establish the second connection.

2. The method of claim 1, further comprising:
providing, in response to receiving the second call management message, the DTMF sequence to the public switched telephone network by the first called device.

3. The method of claim 2, further comprising:
providing the DTMF sequence to the public switched telephone network by the first called device through a third connection.

4. The method of claim 3, further comprising:
terminating the third connection upon establishment of the second connection.

5. The method of claim 1, further comprising:
performing a call conferencing operation by the first connection and the second connection.

6. The method of claim 1, further comprising:
facilitating the first connection by an automatic call distribution system.

7. The method of claim 1, further comprising:
facilitating the second connection by an automatic call distribution system.

8. A telephone call management system, comprising:
means for receiving a call over a public switched telephone network from a calling device;
means for establishing a first connection between the calling device and a first called device through the public switched telephone network;
means for determining a second called device should be added to the call;
means for issuing a first call management message from the first called device to a call routing engine, the first call management message to request the call routing engine issue a second call management message to initiate establishment of a second connection to enable a call among the calling device, the first called device, and the second called device; and
means for receiving the second call management message from the call routing engine at the first called device, the second call management message specifying a DTMF sequence for provision by the first called device to the public switched telephone network to cause the public switched telephone network to establish the second connection.

9. The system of claim 8, further comprising:
means for providing, in response to receiving the second call management message, the DTMF sequence to the public switched telephone network by the first called device.

10. The system of claim 9, further comprising:
means for providing the DTMF sequence to the public switched telephone network by the first called device through a third connection.

11. The system of claim 10, further comprising:
means for terminating the third connection upon establishment of the second connection.

12. The system of claim 8, further comprising:
means for performing a call conferencing operation by the first connection and the second connection.

13. The system of claim 8, further comprising:
means for facilitating the first connection by an automatic call distribution system.

14. The system of claim 8, further comprising:
means for facilitating the second connection by an automatic call distribution system.

15. A telephone call management system, comprising:
a first called device having an interface to receive a call over a public switched telephone network from a calling device, the interface to connect the first called device to the calling device via a first connection through the public switched telephone network;
a call routing engine to receive a first call management message from the first called device, the first call management message to request the call routing engine issue a second call management message to initiate establishment of a second connection to enable a call among the calling device, the first called device, and a second called device; and
the call routing engine to issue, in response to the first call management message, the second call management message to the first called device, the second call management message specifying a DTMF sequence for provision by the first called device to the public switched telephone network to cause the public switched telephone network to establish the second connection.

16. The system of claim 15, further comprising:
the first called device to receive the second call management message, and in response to receiving the second call management message, the first called device to provide the DTMF sequence to the public switched telephone network.

17. The system of claim 16, further comprising:
the first called device to provide the DTMF sequence to the public switched telephone network through a third connection.

18. The system of claim 17, further comprising:
the routing engine to initiate termination of the third connection upon establishment of the second connection.

19. The system of claim 15, further comprising:
the routing engine to initiate a call conferencing operation by the first connection and the second connection.

20. The system of claim 15, further comprising:
an automatic call distribution system to facilitate the first connection.

21. The system of claim 15, further comprising:
an automatic call distribution system to facilitate the second connection.

22. A non-transitory computer readable media containing instructions for execution on a processor, the instructions, when executed, operable to:
- receive a call over a public switched telephone network from a calling device;
- establish a first connection between the calling device and a first called device through the public switched telephone network;
- determine a second called device should be added to the call;
- issue a first call management message from the first called device to a call routing engine, the first call management message to request the call routing engine issue a second call management message to initiate establishment of a second connection to enable a call among the calling device, the first called device, and the second called device; and
- receive the second call management message from the call routing engine, at the first called device, the second call management message specifying a DTMF sequence for provision by the first called device to the public switched telephone network to cause the public switched telephone network to establish the second connection.

23. A telephone call management method, comprising:
- receiving a call over a telephone network from a calling device;
- establishing a first connection between the calling device and a first called device through the telephone network;
- issuing a first call management message from the first called device, the first call management message to request issue of a second call management message used in establishment of a second connection to enable a call among the calling device, the first called device, and a second called device; and
- receiving the second call management message at the first called device, the second call management message specifying a DTMF sequence for provision by the first called device to the telephone network to cause the telephone network to establish the second connection.

24. The method as in claim 23, further comprising:
using a public switched telephone network as the telephone network.

25. The method as in claim 23, further comprising:
receiving the first call management message by a call routing engine.

26. The method as in claim 25, further comprising:
issuing the second call management message from the call routing engine.

27. The method of claim 23, further comprising:
providing, in response to receiving the second call management message, the DTMF sequence to the telephone network by the first called device.

28. The method of claim 27, further comprising:
providing the DTMF sequence to the telephone network by the first called device through a third connection.

29. The method of claim 28, further comprising:
terminating the third connection upon establishment of the second connection.

30. The method of claim 23, further comprising:
performing a call conferencing operation by the first connection and the second connection.

31. The method of claim 23, further comprising:
facilitating the first connection by an automatic call distribution system.

32. The method of claim 23, further comprising:
facilitating the second connection by an automatic call distribution system.

33. A telephone call management system, comprising:
- means for receiving a call over a telephone network from a calling device;
- means for establishing a first connection between the calling device and a first called device through the telephone network;
- means for issuing a first call management message from the first called device, the first call management message to request issue of a second call management message used in establishment of a second connection to enable a call among the calling device, the first called device, and a second called device; and
- means for receiving the second call management message at the first called device, the second call management message specifying a DTMF sequence for provision by the first called device to the telephone network to cause the telephone network to establish the second connection.

34. The system as in claim 33, further comprising:
means for using a public switched telephone network as the telephone network.

35. The system as in claim 33, further comprising:
means for receiving the first call management message by a call routing engine.

36. The system as in claim 35, further comprising:
means for issuing the second call management message from the call routing engine.

37. The system of claim 33, further comprising:
means for providing, in response to receiving the second call management message, the DTMF sequence to the telephone network by the first called device.

38. The system of claim 37, further comprising:
means for providing the DTMF sequence to the telephone network by the first called device through a third connection.

39. The system of claim 38, further comprising:
means for terminating the third connection upon establishment of the second connection.

40. The system of claim 33, further comprising:
means for performing a call conferencing operation by the first connection and the second connection.

41. The system of claim 33, further comprising:
means for facilitating the first connection by an automatic call distribution system.

42. The system of claim 33, further comprising:
means for facilitating the second connection by an automatic call distribution system.

43. A telephone call management system, comprising:
- a first called device having an interface to receive a call over a telephone network from a calling device, the interface to connect the first called device to the calling device via a first connection through the telephone network;
- a call routing engine to receive a first call management message from the first called device, the first call management message to request the call routing engine issue a second call management message to initiate establishment of a second connection to enable a call among the calling device, the first called device, and a second called device; and
- the call routing engine to issue, in response to the first call management message, the second call management message to the first called device, the second call management message specifying a DTMF sequence for provision by the first called device to the telephone network to cause the telephone network to establish the second connection.

44. The system of claim 43, further comprising:
the first called device to receive the second call management message, and in response to receiving the second call management message, the first called device to provide the DTMF sequence to the telephone network.

45. The system of claim 44, further comprising:
the first called device to provide the DTMF sequence to the telephone network through a third connection.

46. The system of claim 45, further comprising:
the routing engine to initiate termination of the third connection upon establishment of the second connection.

47. The system of claim 43, further comprising:
the routing engine to initiate a call conferencing operation by the first connection and the second connection.

48. The system of claim 43, further comprising:
an automatic call distribution system to facilitate the first connection.

49. The system of claim 43, further comprising:
an automatic call distribution system to facilitate the second connection.

50. A non-transitory computer readable media containing instructions for execution on a processor, the instructions, when executed, operable to:
receive a call over a telephone network from a calling device;
establish a first connection between the calling device and a first called device through the telephone network;
issue a first call management message from the first called device, the first call management message to request issue of a second call management message used in establishment of a second connection to enable a call among the calling device, the first called device, and a second called device; and
receiving the second call management message at the first called device, the second call management message specifying a DTMF sequence for provision by the first called device to the telephone network to cause the telephone network to establish the second connection.

* * * * *